(No Model.)
J. B. BURR.
SAW SET.
No. 565,722.　　　　　Patented Aug. 11, 1896.
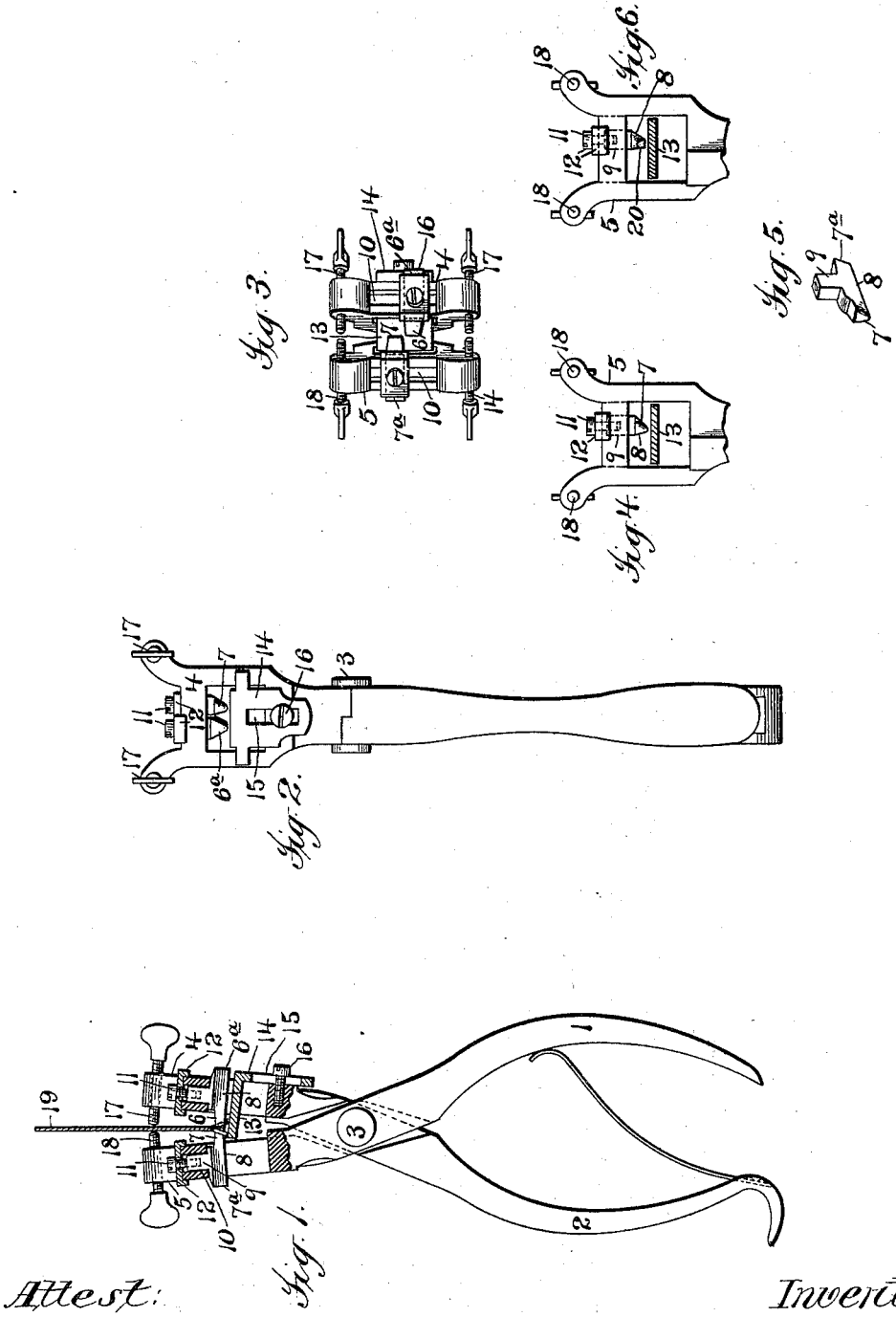
Attest:
Geo. H. Botts
A. V. Bourke
Inventor:
James B. Burr
By Philipp Mumann & Phelps
Attys
THE NORRIS PETERS CO., PHOTO-LITHO., WASHINGTON, D. C.

UNITED STATES PATENT OFFICE.

JAMES B. BURR, OF COMMACK, NEW YORK.

SAW-SET.

SPECIFICATION forming part of Letters Patent No. 565,722, dated August 11, 1896.

Application filed May 9, 1896. Serial No. 590,837. (No model.)

*To all whom it may concern:*

Be it known that I, JAMES B. BURR, a citizen of the United States, residing at Commack, county of Suffolk, and State of New York, have invented certain new and useful Improvements in Saw-Sets, fully described and represented in the following specification and the accompanying drawings, forming a part of the same.

This invention relates to improvements in saw-sets.

The invention consists of a saw-set provided with a pair of setting-plungers removably mounted in suitable supports and movable in opposite directions toward and past each other, which upon being operated engage, respectively, the under and upper sides of two contiguous teeth and, bending them upwardly and downwardly, respectively, simultaneously set them. Each pair of teeth, inclined in opposite directions, is similarly treated, the tool or saw being shifted relatively to each other after each operation to bring into position a fresh pair of teeth. The setting-plungers are adjustably mounted in their supports, so that they may be adjusted to and from each other for the purpose of accommodating teeth separated varying distances. For the purpose of securing accurate register between the teeth and the setting-plungers a gage-plate is provided, against which the edge of the saw rests during the setting operation, this gage-plate being adjustable to and from the setting-plungers to accommodate saws with varying lengths of teeth. The extent of inclination to which the teeth are set is also regulated by adjustable stops carried by the plunger-supports, which engage each other during the setting operation and limit the movement of the plungers.

In the accompanying drawings, Figure 1 is a side elevation, partly in section, of a saw-set embodying the present invention. Fig. 2 is a plan view of the same. Fig. 3 is an end view of the same. Fig. 4 is a section on the line 4 4 of Fig. 3. Fig. 5 is a detail of the setting-plungers; and Fig. 6 is a view similar to Fig. 4, illustrating a modification in the form of the setting-plungers.

Referring to said drawings, 1 2 represent a pair of arms fulcrumed at 3, in the heads 4 5 of which are mounted the setting mechanism, which will now be described. This setting mechanism consists of a pair of plungers 6 7, mounted adjustably in the heads 4 5, respectively, so as to move toward and past each other, as shown in Fig. 1. The shank or stem 8 of each plunger 6 7 is provided with a tongue 9, adapted to enter a slot 10 in the heads 4 5 and to slide therein laterally, so that the two plungers may be adjusted to and from each other to adapt them for operation upon teeth separated varying distances. When adjusted, the setting-plungers 6 7 are held in place by set-screws 11, entering the ends of the tongues 9, and the heads of which engage cap-plates 12, interposed between them and the end faces of the heads 4 5. In rear of the setting-plungers 6 7 is provided an adjustable gage-plate 13, against which the edge of the saw rests during the setting operation. This plate 13 is provided at its upper end with a rearwardly-extending portion 14, having a longitudinal slot 15, through which passes a screw 16, which enters the head 4 and holds the gage-plate 13 in position. By loosening the screw 16 the gage-plate 13 may be adjusted to and from the setting-plungers 6 7 to any desired position, so as to accommodate any length of tooth.

The setting-plungers 6 7, it will be observed, are triangular in cross-section, approximating in shape a saw-tooth, and when in position over a saw their front or broad faces will register with the bases of the teeth thereof. The extent of movement of the plungers 6 7, and therefore the inclination given to the teeth set thereby, is limited by two pair of adjustable stops 17 18 on the forward ends of the heads 4 5, which come in contact with the sides of the saw during the setting operation, and thus arrest the movement of the setting-plungers 6 7. (See Fig. 1.) By unscrewing the stops 17 18 the inclination given the teeth is increased, and by screwing them in it is decreased, as will be readily understood.

The manner of using the saw-set thus described is as follows: The stops 17 18 will be adjusted to or from each other according to the inclination to be given the teeth of the saw to be set, the gage-plate 13 will be adjusted to or from the setting-plungers 6 7 in accordance with the length of the teeth, and the setting-plungers 6 7 will be adjusted to or from each other according to the separation between the teeth of the saw. The parts thus adjusted being secured in position, the saw, as 19, to be set will be introduced between the heads 4 5, with its edge in contact with the gage-plate 13, as shown in Fig. 1, and with the two first teeth of the saw below and above, respectively, the two setting-plungers 6 7. Power being applied to the arms 1 2, the two plungers 6 7 will be moved toward and past each other and bend the two first teeth of the saw downwardly and upwardly, respectively, as shown in Fig. 1, thus at a single operation simultaneously setting both teeth. The saw or tool will then be shifted so as to bring the next pair of teeth to be set in position below and above the plungers 6 7, when the operation will be repeated. This operation will be continued until all the teeth of the saw are set. By this construction a great saving in time and labor is effected. A further saving may be secured by increasing the number of setting-plungers, so as to set two, three, or even more pairs of teeth simultaneously, but the construction shown is preferred.

It will be observed that each stem 8 is provided with a second plunger $6^a$ $7^a$, respectively. These are of larger size in cross-section than the plungers 6 7, so as to fit saw-teeth of larger size. To bring these larger plungers $6^a$ $7^a$ into operative position, all that is necessary to be done is to withdraw the tongues 9 from the slots 10, reverse them, and then secure them in the slots, when the setting-plungers $6^a$ $7^a$ will occupy the positions now occupied by the plungers 6 7, respectively. To provide for still greater variations in size of teeth, a supply of smaller or larger setting-plungers may be kept on hand which can readily be secured in place, and for the purpose of reducing the number of such plungers for each machine each stem, instead of being provided with only two plungers, as shown, may be provided with any other number desired. As the number is increased corresponding changes will of course be made by cutting away portions of the heads, so as to permit of the lateral movement of the plungers in adjustment. For saws with very small teeth I prefer to provide an extra setting-plunger 20, (see Fig. 6,) which differs from the others in that it is of much smaller size in cross-section and when in setting position will have its apex turned toward the bases of the teeth instead of away from them as before.

What is claimed is—

1. The combination in a saw-setting tool, of the pivoted arms 1, 2, reversible plungers 6, 7, mounted in the heads thereof and transversely adjustable therein to and from each other, and gage 13 mounted in one of the heads and adjustable longitudinally thereof for engaging the saw-teeth, substantially as described.

2. The combination in a saw-setting tool, of the pivoted arms 1, 2, reversible plungers 6, 7, mounted in the heads thereof and transversely adjustable therein to and from each other, gage-plate 13 mounted in one of the heads and adjustable longitudinally thereof for engaging the saw-teeth, and adjustable stops 17, 18, in each head on opposite sides of the setting-plungers, for engaging the sides of the saws, substantially as described.

In testimony whereof I have hereunto set my hand in the presence of two subscribing witnesses.

JAMES B. BURR.

Witnesses:
TUNIS B. BURR,
FRANK P. BURR.